Figure 1:
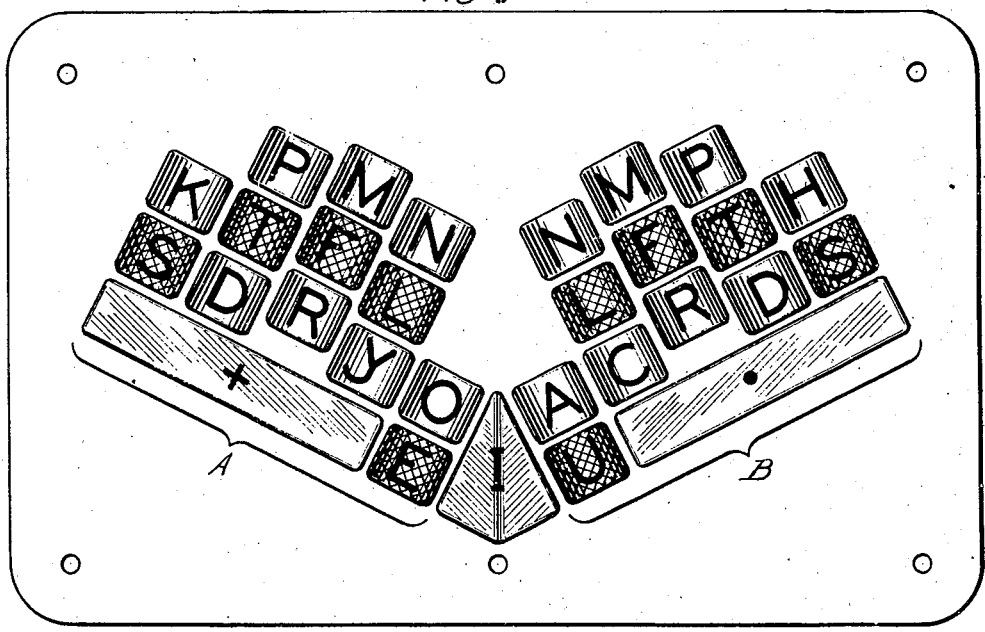

May 4, 1943.  C. C. M. PALANQUE  2,318,519

SHORTHAND TYPEWRITING MACHINE

Filed Sept. 28, 1940  2 Sheets-Sheet 1

INVENTOR.
Clementine C. M. Palanque.
By William C. Linton
Atty.

May 4, 1943.    C. C. M. PALANQUE    2,318,519
SHORTHAND TYPEWRITING MACHINE
Filed Sept. 28, 1940    2 Sheets-Sheet 2

INVENTOR.
Clementine C. M. Palanque.
BY William C. Linton
Atty.

Patented May 4, 1943

2,318,519

UNITED STATES PATENT OFFICE 2,318,519

SHORTHAND TYPEWRITING MACHINE

Clementine Camille Marie Palanque, London, England

Application September 28, 1940, Serial No. 358,896
In Great Britain September 28, 1939

13 Claims. (Cl. 197—100)

This invention relates to an improved form of shorthand typewriting machine of the kind wherein the keys of the keyboard for the various symbols are divided into groups, those for the vowels being situated in the middle of the keyboard and those for the various consonants being grouped around them.

One object of the invention is to provide an improved arrangement and grouping of the keys which has certain advantages in case of manipulation and speedy operation combined with an improved arrangement of the letters on the keys which enables the machine to be used for typing in various languages.

Another object of the invention is to provide a keyboard arranged for operation by a pair of hands and wherein the positions of the keys for certain letters are so arranged that the position of rest of the fingers on the keys corresponds to that which the finger tips take up when the hands fall naturally on a horizontal surface. The positions of these keys will be hereinafter referred to as the "home positions" as they are the positions which the fingers naturally take up as soon as the hands are laid thereon. A careful study of the various important languages has been made in comparison with the English language and as a result certain letters of the English or Roman alphabet have been selected as being in most constant use in typing the various languages, taking into consideration both the phonetics and the spelling of the languages.

Reading from left to right of the horizontal, the letters selected for the home position keys are S T F L E for the left hand, i. e., the initial keys, and U L F T S for the right hand, i. e., the final keys. The keys for the remaining letters are grouped around the two home position groups, the initial keys around the left hand group and the final keys around the right hand group. Between the two groups the vowel keys are arranged to be operated by the two thumbs.

These vowel keys are arranged around a central vowel key in such a manner that the thumbs are able to depress two or even three keys simultaneously to produce diphthongs in one operation.

A further object of the invention is to provide a keyboard wherein the keys are arranged at varying heights all with the object of obtaining easy operation with minimum movements of the hands and also to enable one finger to depress more than one key simultaneously.

The home position keys may be covered with a different material from the others to assist the operator in finding and retaining the home position. For example the home position keys may be covered with a textile material or rubber while the other keys are of the usual smooth metallic or composition finish.

Figure 2:
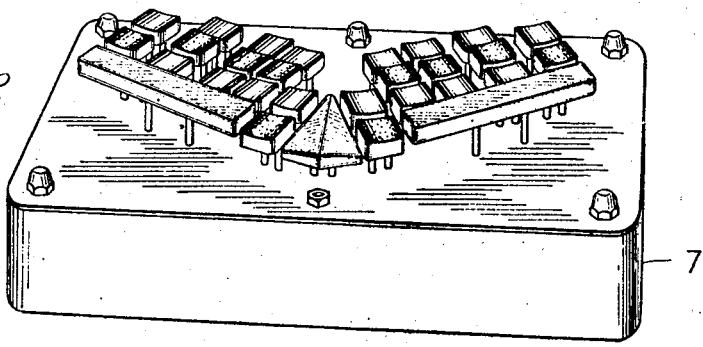
Figure 3:
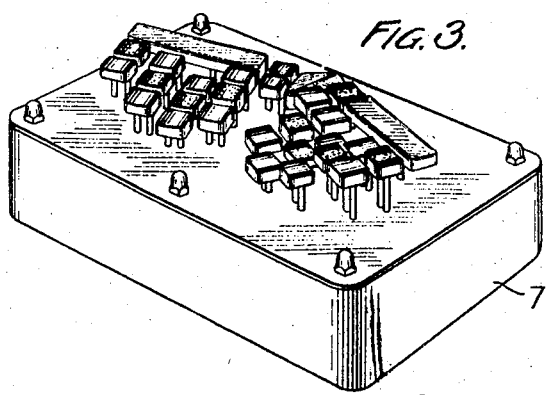

An example of a keyboard arranged according to one form of the invention is illustrated in plan view in Fig. 1 of the accompanying drawings, Fig. 2 is a front perspective view and Fig. 3 is a rear perspective view thereof both drawn to a smaller scale.

Figure 4:
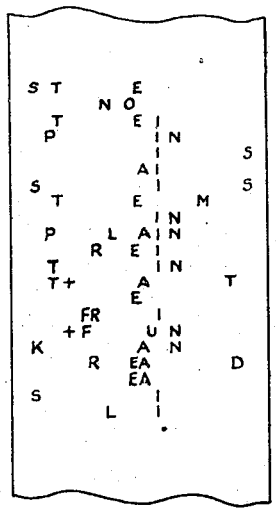
Figure 5:
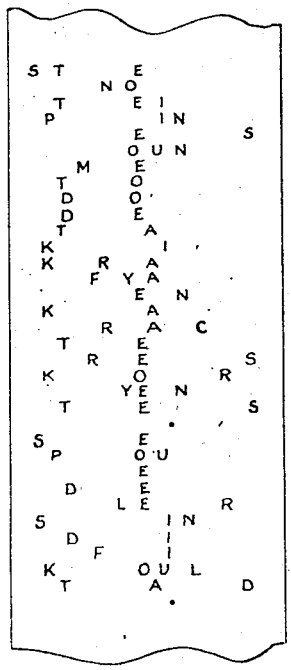
Figure 6:
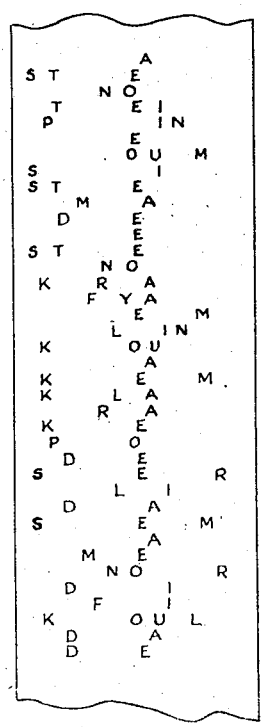

Figs. 4, 5 and 6 show the typing of a sentence on a paper strip by use of the keyboard illustrated in Figs. 1–3 respectively in English, Spanish and Portuguese, together with a line for line transcript of the typescript in each case.

Referring to the drawings, a keyboard arranged for typing shorthand in various languages is illustrated and for the purpose of explanation is shown as mounted on a box 7.

The symbols in this case are the letters of the English or Roman alphabet with the addition of a + (plus) key and a . (period) key which can be used for modifying the sound of a consonant or for indicating the length of a vowel. The + key can also be used to indicate H and also struck with other letters to give additional symbols, for example +F=W or P+=B.

The . (period) and + keys can be struck with any other letter as they are easily accessible to any finger not otherwise occupied. A hybrid letter consisting of a combination of J and Y is also preferably used. The initial keys are shewn at A and the final keys at B while the vowel keys are grouped round a central key of triangular shape marked I. The home position keys are cross-hatched and it will be found that if the fingers be placed thereon they will fall naturally into such positions and also that the two thumbs can readily operate the vowel keys separately or one or both of the vowel keys adjacent to the central key I can be depressed together with the central key by one of the thumbs to produce diphthongs.

The lettering of the keys in the manner illustrated is as before mentioned the result of long study of the English language in comparison with other languages and the possible combinations most useful in typing shorthand. It will be understood that the shorthand to be typed may be phonetic or include a certain proportion of phonetics together with plain typing. Various systems may be evolved.

With the keyboard illustrated the order of striking the keys in practice is as follows: S K P T D+M F R N L and the hybrid letter on the initial side, O E A U I at the center and . (period) N L C M F R P T D S H on the final side.

It will be noted that the keyboard is also arranged to compensate for the varying lengths of the fingers.

Considering the left hand side of the keyboard the key S operated by the little finger is placed a key distance in front of the key T which is operated by the third finger. The key T is a half key distance in front of the key F operated by the second finger which is the longest finger while the key L which is operated by the index finger is placed at the distance of half a key in front of key F.

Further the key E operated by the thumb which is the shortest of the digits is placed at a key distance in front of the key S operated by the little finger. The keys representing the + (plus) and . (period) are adapted to be operated by any digit not otherwise engaged and for this purpose they are arranged at a suitable slope from the level of the S key to that of the E key on the left hand side and correspondingly on the right hand side as shewn. These keys can also be operated with vowel keys as will be understood. The other keys are grouped as shewn. The little finger which is the shortest is only intended to operate two keys K and S. It will be noted that the left and right hand groups of keys are arranged at an angle about the central key I. This is to relieve strain on the operator. A straight line drawn through the center of the keys M F R in each group is approximately horizontally parallel to a line passing through the elbow, the center of the wrist and the center of the first joint of the second finger of the operator. This arrangement prevents twisting of the wrist and avoids cramp.

Fig. 2 shews that the keys are also arranged at various heights, all carefully calculated to compensate still further for the varying lengths of the fingers. The keys S K for the little finger are higher than the keys D T P for the third finger while the keys M F R for the middle finger which is the longest are lower than the others. In the D T P group the D key is slightly higher than the T key. In the M F R group the key M is placed slightly lower than the key F so that the operator can easily recognise by touch the position to be occupied by the tip of the middle finger and also both keys are more easily struck at the same time when the tip of the finger is on M F. The M key must not be placed so low that it prevents the operation of the keys M F by a single finger. This operation is facilitated by making a slight depression in the key M as shown. The same applies to the group N L J. This group is designed for the first finger and is higher than the group M F R. The key N is also lower than the key L and the difference of level between keys N and L is greater than that between keys M and F. This difference facilitates the striking of keys N L. The relatively weak little finger only has two keys to operate and its weakness is compensated by arranging that the keys which it operates are higher than all the others.

The vowel keys are operated by the thumbs and as these are largely used in typing English, in combination with I, the keys are arranged around the large triangular shaped I key and it will be obvious that this key may readily be struck together with one or both of the adjacent vowel keys by one thumb thus facilitating the typing of diphthongs.

Figs. 4, 5 and 6 illustrate the ease with which the typing produced by the keyboard according to the invention can be read and transcribed.

Fig. 4 shews a portion of a strip having an English sentence typed therein by a machine using the keyboard illustrated and the sentence is transcribed adjacent to the right hand side of the strip line for line with the typescript. It will be noted that use is made of phonetics.

Figs. 5 and 6 are similar illustrations but with sentences in Spanish and Portuguese respectively. It will be obvious that the typescripts in all three languages can be easily read and transcribed.

Further for teaching purposes the keyboard may be used for practice without the addition of any typewriting mechanism.

For example the plungers carrying the keys as shewn may press against suitable springs arranged in the box or frame 7 so that when a key is depressed it will return to its original position just as in a typewriter. Thus a compact teaching apparatus is provided which can be manufactured in quantities at a low cost.

It will be understood that while the invention relates more particularly to those languages which can be typed in English or Roman characters, certain features thereof are applicable to shorthand typing machines wherein characters other than English or Roman are employed.

The keyboard may be used with any suitable typewriting mechanism embodying the necessary paper feeding, spacing, type bars and inking mechanism, the present invention being concerned solely with the arrangement of the keys and keyboard.

I claim:

1. In a shorthand typewriting machine, a group of keys disposed for operation by the fingers of one hand of the operator and comprising a central row of keys with the letters M F R thereon, respectively, and other rows of keys arranged in a plane higher than that of said central row of keys, said key with the letter M thereon having a slight concavity in the upper face thereof and said key with the letter M thereon lying in a plane slightly lower than that of the key having the letter F thereon.

2. In a shorthand typewriting machine, a bar key, four parallel rows of keys extending rearwardly of said bar key, the first row of keys consisting of two keys having the letters S and K thereon, the second row of keys consisting of three keys having the letters D T and P thereon, the third row of keys consisting of three keys having the letters M F and R thereon and the fourth row of keys consisting of three keys having respectively a hybrid letter, the letter L and the letter N thereon, said second row of keys lying in a plane slightly lower than the first row of keys, the third row of keys lying in a plane slightly lower than the second row of keys, the key with the letter M thereon lying in a plane slightly lower than the remaining keys in the same row therewith, the keys of the fourth row lying in a plane higher than the third row of keys with the letters M F and R thereon, the key with the letter N thereon being in a lower plane than that of the key with the letter L thereon and the difference in level between the keys N and L being greater than that between the keys M and F.

3. In a shorthand typewriting machine, a keyboard having a central group of vowel keys, a group of initial consonant keys located at one side of said vowel keys, a group of final consonant keys located at the opposite side of said vowel keys, said groups of keys being arranged in rows, one row of each group of initial and final consonant keys having two keys with the letters T and D respectively thereon and the striking surface of the D key of both the initial and final groups of consonant keys lying in a plane higher than that of the T keys.

4. In a shorthand typewriting machine, a keyboard having a triangular shaped central vowel key, other vowel keys arranged closely adjacent and about said central vowel key, a plus bar key extending at an angle from one side of said vowel keys, a period bar key extending at an angle from the opposite side of said vowel keys, an initial group of keys arranged rearwardly of said plus bar key, a final group of keys arranged rearwardly of said period bar key, the keys of both the final and initial groups of keys being arranged in parallel rows, a key of one row of each group of initial and final keys having the letter S thereon, the second row of keys in both the initial and final groups having the letters D T and P thereon and each key lying in a plane lower than that of the first mentioned rows of keys, the third row of keys of both the initial and final groups of keys having the letters R F and M thereon and the keys thereof lying in a plane lower than that of the second mentioned rows of keys, the fourth row of keys of both the initial and final groups having the letters L and N thereon and the keys thereof lying in a plane higher than that of the third mentioned rows of keys, the keys having the letters S thereon of the first mentioned rows of keys being placed a key distance in front of the keys with the letter T thereon of the second mentioned rows of keys, said keys with the letter T thereon being placed a half key distance in front of the keys with the letter F thereon of the third mentioned rows of keys, said keys with the letter L thereon being placed at a distance of a half a key in front of the keys with the letter F thereon of the third mentioned rows of keys, the vowel key with the letter E thereon being placed at one end of the plus bar key and a key distance in front of the key having the letter S thereon of the first mentioned row of the initial group of keys, the vowel key with the letter U thereon being placed at one end of the period bar key and a key distance in front of the key having the letter S thereon of the first mentioned row of the final group of keys the home positioned keys of the initial group of keys having the letters S T F L E thereon and the home positioned keys of the final group of keys having the letters U L F T S thereon.

5. In a stenographic machine of the character described, a keyboard having a single central key, a set of five rows of keys on each side of the central key disposed for operation by the fingers of one hand of the operator and each arranged at an angle to a central axial line passing through the central key, each set of key rows comprising a row of two vowel keys arranged immediately adjacent to the central key so that either may be operated independently of the central key or operated by the same finger of the operator's hand conjointly with the central key, three rows of three consonant keys each, and a final row of two consonant keys, each row of keys of each set including a home position key and the home position keys of each set being so relatively disposed as to be engaged by the tips of the fingers of the hand of the operator in the natural positions assumed by the fingers when the hand is disposed in position for operating the set of keys.

6. In a stenographic machine of the character described, a keyboard having a central key, a set of rows of keys on each side of the central key and each arranged at an angle to a central axial line passing through the central key, each row of keys of each set including a home position key, and each set of key rows comprising a row of two keys immediately adjacent to the central key, three rows of three keys each, a final row of two keys, and a single bar key disposed at the front of each of the rows except that immediately adjacent to the central key, the bar keys respectively bearing indications which are used to modify the sounds of characters represented by the row keys.

7. In a stenographic machine according to claim 6, an arrangement wherein the home position keys have the letters S T F L E for the left hand or initial letter group and the letters U L F T S for the right hand or final letter group, the central key having the vowel I and the rows immediately adjacent thereto on each side thereof having the letters O E A U so that all the vowels are grouped around the central key for operation by the thumbs of the operator.

8. In a stenographic machine of the character described, a keyboard having a central key, a set of rows of keys on each side of the central key and each arranged at an angle to a central axial line passing through the central key, each row of keys of each set including a home position key and each set of key rows comprising two keys immediately adjacent to the central key, three rows of three keys each and a final row of two keys, and a single bar key disposed at the front of each of the rows except that immediately adjacent to the central key, the bar keys of the respective sets respectively bearing an indication which is used to modify the sound of a consonent and an indication for designating the length of a vowel sound.

9. In a shorthand typewriting machine, a central key, two groups of keys arranged on opposite sides of said central key, the keys in each of said groups being arranged in five parallel rows lying oblique to the central axis of said central key, each of the first inside rows adjacent said central key consisting of two keys, each of the next three rows in each group consisting of three keys, and the outside fifth row in each group consisting of two keys, the front key in each of said first inside rows being positioned one key space in front of the front key of the second row adjacent thereto, the front keys of the outside fifth row and the fourth row next to the outside fifth row being frontwardly aligned with said front key of the second row, and the front key of the third row being backset one-half key space from said front key of said second row next to the inside row.

10. A machine according to claim 9, the striking surfaces of the keys in said second and fourth rows being higher than the striking surfaces of the keys in said third row and lower than the striking surfaces of the keys in said fifth outside row.

11. A machine according to claim 9, the striking surfaces of the keys in said second and fourth rows being higher than the striking surfaces of the keys in said third row and lower than the striking surfaces of the keys in said fifth outside row, and the striking surface of one key in each of said second and third rows being slightly lower than the other keys in said row.

12. A machine according to claim 9, the striking surfaces of the keys in said second and fourth rows being higher than the striking surfaces of the keys in said third row and lower than the striking surfaces of the keys in said fifth outside row, the striking surface of one key in each of said second and third rows being slightly lower than the other keys in said row, and the striking surface of the low key in said second row being vertically displaced from the other keys in that row by a distance greater than the striking surface of the low key in said third row is vertically displaced from the other keys in said third row.

13. In a stenographic machine of the character described, a keyboard having a single central key, a set of five rows of keys on each side of the central key disposed for operation by the fingers of one hand of the operator and each arranged at an angle to a central axial line passing through the central key, each set of key rows comprising a row of two vowel keys arranged immediately adjacent to the central key so that either may be operated independently of the central key or operated by the same finger of the operator's hand conjointly with the central key, three rows of three consonant keys each, and a final row of two consonant keys, the rows of keys of one set including home position keys respectively bearing the characters E L F T S and the rows of keys of the other set including home position keys respectively bearing the characters U L F T S, and the home position keys of each set being so relatively disposed as to be engaged by the tips of the fingers of the hand of the operator in the natural positions assumed by the fingers when the hand is disposed in position for operating the set of keys.

CLEMENTINE CAMILLE MARIE PALANQUE.